(12) United States Patent
Tsai et al.

(10) Patent No.: US 7,586,989 B2
(45) Date of Patent: Sep. 8, 2009

(54) METHOD AND SYSTEM FOR GENERATING BEAM-FORMING WEIGHTS IN AN ORTHOGONAL FREQUENCY DIVISION MULTIPLEXING NETWORK

(75) Inventors: Jiann-An Tsai, Richardson, TX (US); Cornelius van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 11/285,546

(22) Filed: Nov. 22, 2005

(65) Prior Publication Data

US 2007/0116138 A1     May 24, 2007

(51) Int. Cl.
| | |
|---|---|
| H04K 1/10 | (2006.01) |
| H04B 1/00 | (2006.01) |
| H03K 9/00 | (2006.01) |
| H04B 1/38 | (2006.01) |
| H04L 27/00 | (2006.01) |
| H04L 7/00 | (2006.01) |

(52) U.S. Cl. ............... 375/260; 375/132; 375/316; 375/219; 375/295; 375/358

(58) Field of Classification Search .......... 375/132, 375/260, 316, 219, 295, 358
See application file for complete search history.

(56) References Cited

U.S. PATENT DOCUMENTS

| | | | | |
|---|---|---|---|---|
| 6,205,410 | B1 * | 3/2001 | Cai | 702/191 |
| 6,373,433 | B1 * | 4/2002 | Espax et al. | 342/368 |
| 6,687,492 | B1 * | 2/2004 | Sugar et al. | 455/276.1 |
| 6,940,917 | B2 * | 9/2005 | Menon et al. | 375/267 |
| 2001/0053143 | A1 * | 12/2001 | Li et al. | 370/344 |
| 2003/0099285 | A1 * | 5/2003 | Graziano et al. | 375/220 |
| 2004/0001554 | A1 * | 1/2004 | Sun et al. | 375/260 |
| 2005/0111492 | A1 * | 5/2005 | Kang et al. | 370/480 |
| 2005/0254477 | A1 * | 11/2005 | Lee et al. | 370/342 |

OTHER PUBLICATIONS

Beam space adaptive array based on subband signal processing Kamiya, Y.; Karasawa, Y.; Antennas and Propagation for Wireless Communications, 1998. 1998 IEEE-APS Conference on Nov. 1-4, 1998 pp. 41-44.*

* cited by examiner

*Primary Examiner*—Mohammad H Ghayour
*Assistant Examiner*—Sarah Hassan

(57) ABSTRACT

A method of generating beam-forming weights in an orthogonal frequency division multiplexing network is provided. The method includes generating a plurality of sub-bands. Each sub-band comprises a plurality of sub-carriers. A single beam-forming weight is generated for each sub-band.

20 Claims, 3 Drawing Sheets

METHOD AND SYSTEM FOR GENERATING BEAM-FORMING WEIGHTS IN AN ORTHOGONAL FREQUENCY DIVISION MULTIPLEXING NETWORK

TECHNICAL FIELD OF THE INVENTION

The present disclosure relates generally to wireless communications and, more specifically, to a method and system for generating beam-forming weights in an Orthogonal Frequency Division Multiplexing (OFDM) network.

BACKGROUND OF THE INVENTION

Multiple antenna beam-forming techniques have been proposed for OFDM-based wireless communication systems. Conventional techniques include calculating the multiple antenna beam-forming weights for enhancing the OFDM system performance on a sub-carrier basis. Although this approach provides significant system gain, this approach also requires significant computational complexity in calculating the multiple antenna beam-forming weights due to the fact that the calculation of beam-forming weights is performed for each individual sub-carrier. As the number of sub-carriers increases, the computation of the beam-forming weights becomes extremely expensive.

Therefore, there is a need in the art for an improved method for generating beam-forming weights in an OFDM network. In particular, there is a need for a more efficient method of generating beam-forming weights in an OFDM network that is less computationally complex than conventional methods.

SUMMARY OF THE INVENTION

A method for generating beam-forming weights in an orthogonal frequency division multiplexing (OFDM) network is provided. According to an advantageous embodiment of the present disclosure, the method includes generating a plurality of sub-bands, each sub-band comprising a plurality of sub-carriers, and generating a single beam-forming weight for each sub-band.

According to one embodiment of the present disclosure, the method also includes, for each of a plurality of antennas, estimating a frequency-domain channel response for each of a plurality of sub-carriers, and generating the sub-bands based on the estimated frequency-domain channel responses.

According to another embodiment of the present disclosure, the frequency-domain channel responses are estimated based on a received pilot/training signal.

According to still another embodiment of the present disclosure, each sub-band comprises a specified number of sub-carriers, and the specified number is determined based on the estimated frequency-domain channel responses.

According to yet another embodiment of the present disclosure, the method includes, for each antenna, calculating an average frequency-domain channel response for each sub-band and calculating a frequency-domain channel variation for each sub-band. An average frequency-domain channel is calculated over substantially all sub-carriers in a sub-band for substantially all antennas. An error between the average frequency-domain channel over substantially all sub-carriers and a furthest sub-carrier in a sub-band is compared to a variation threshold. The specified number of sub-carriers in a sub-band is determined based on the comparison of the error to the variation threshold.

According to a further embodiment of the present disclosure, the specified number of sub-carriers is incremented when the error is less than the variation threshold.

According to a still further embodiment of the present disclosure, the single beam-forming weight is generated for each sub-band when the error is greater than or equal to the variation threshold.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
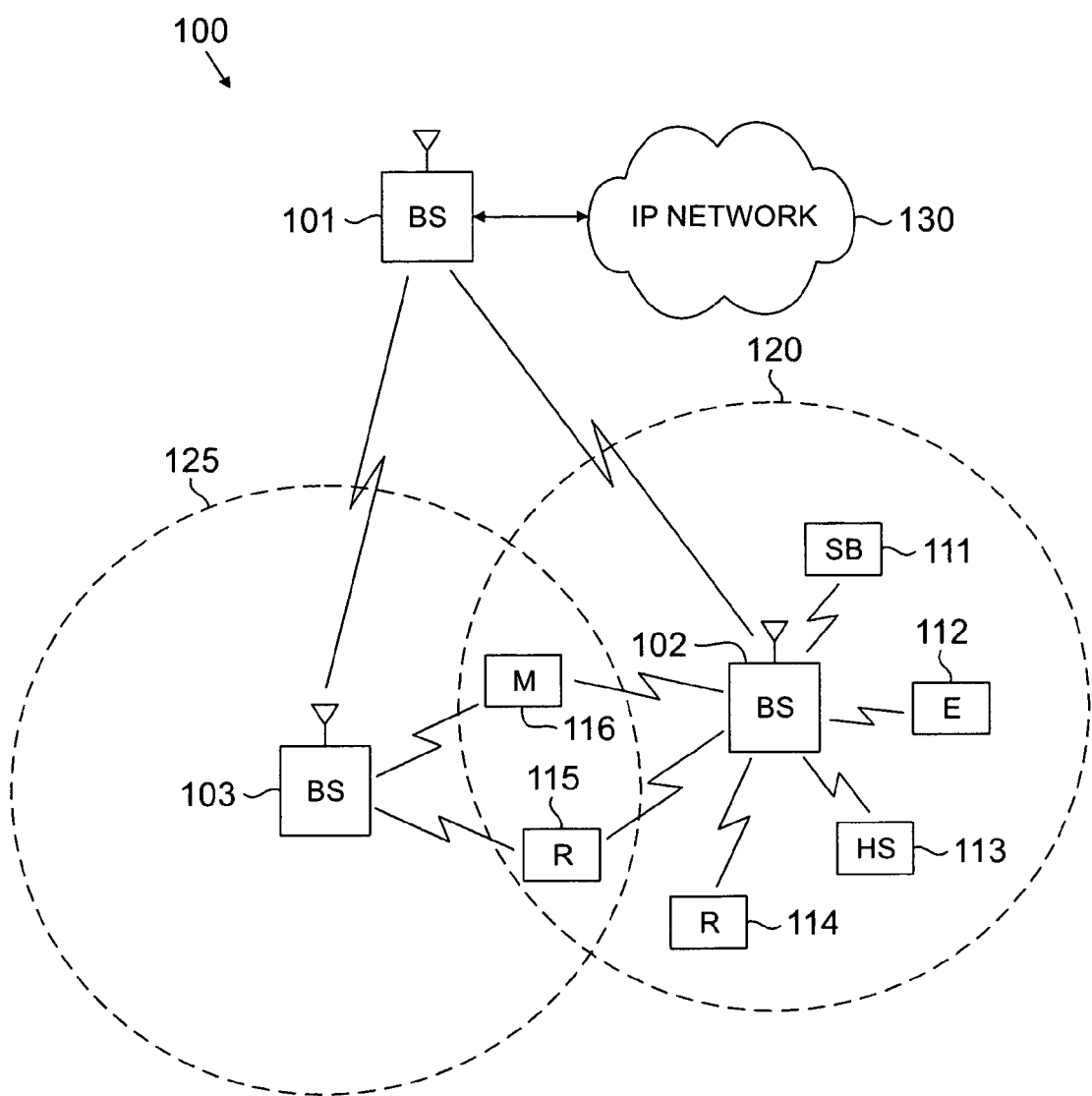
FIG. 1 illustrates an exemplary orthogonal frequency division multiplexing (OFDM) wireless network that is capable of generating beam-forming weights according to an embodiment of the present disclosure.
Figure 2:
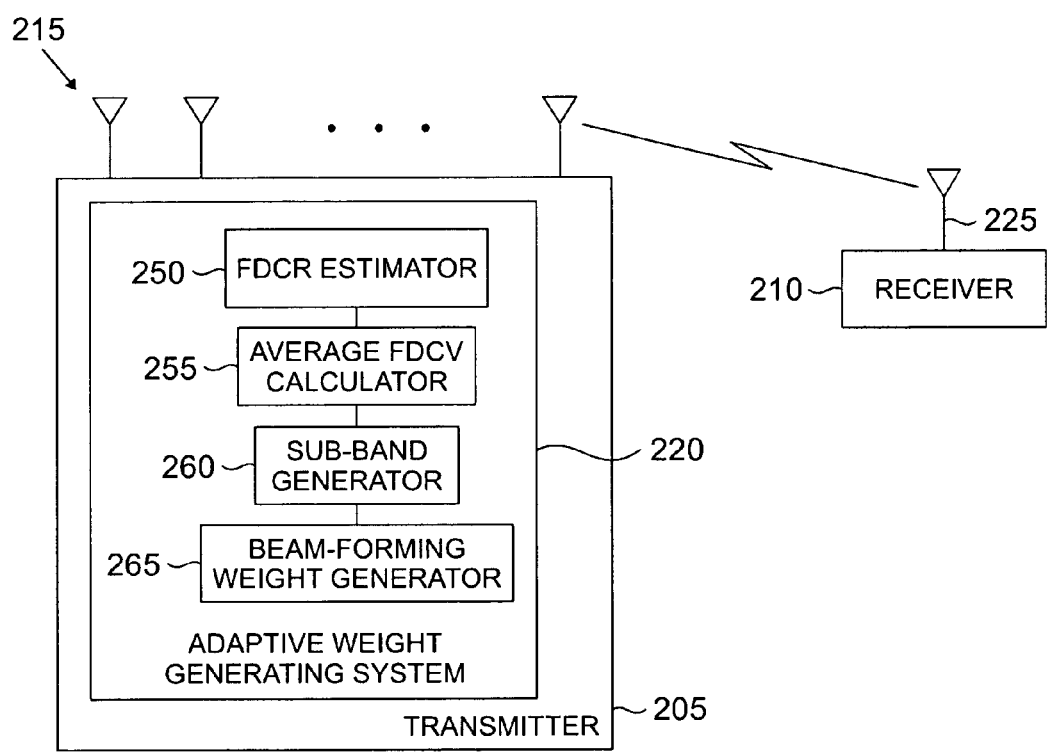
FIG. 2 illustrates details of a portion of the wireless network of FIG. 1 including a system for generating beam-forming weights based on adaptively generated sub-bands according to an embodiment of the present disclosure.
Figure 3:
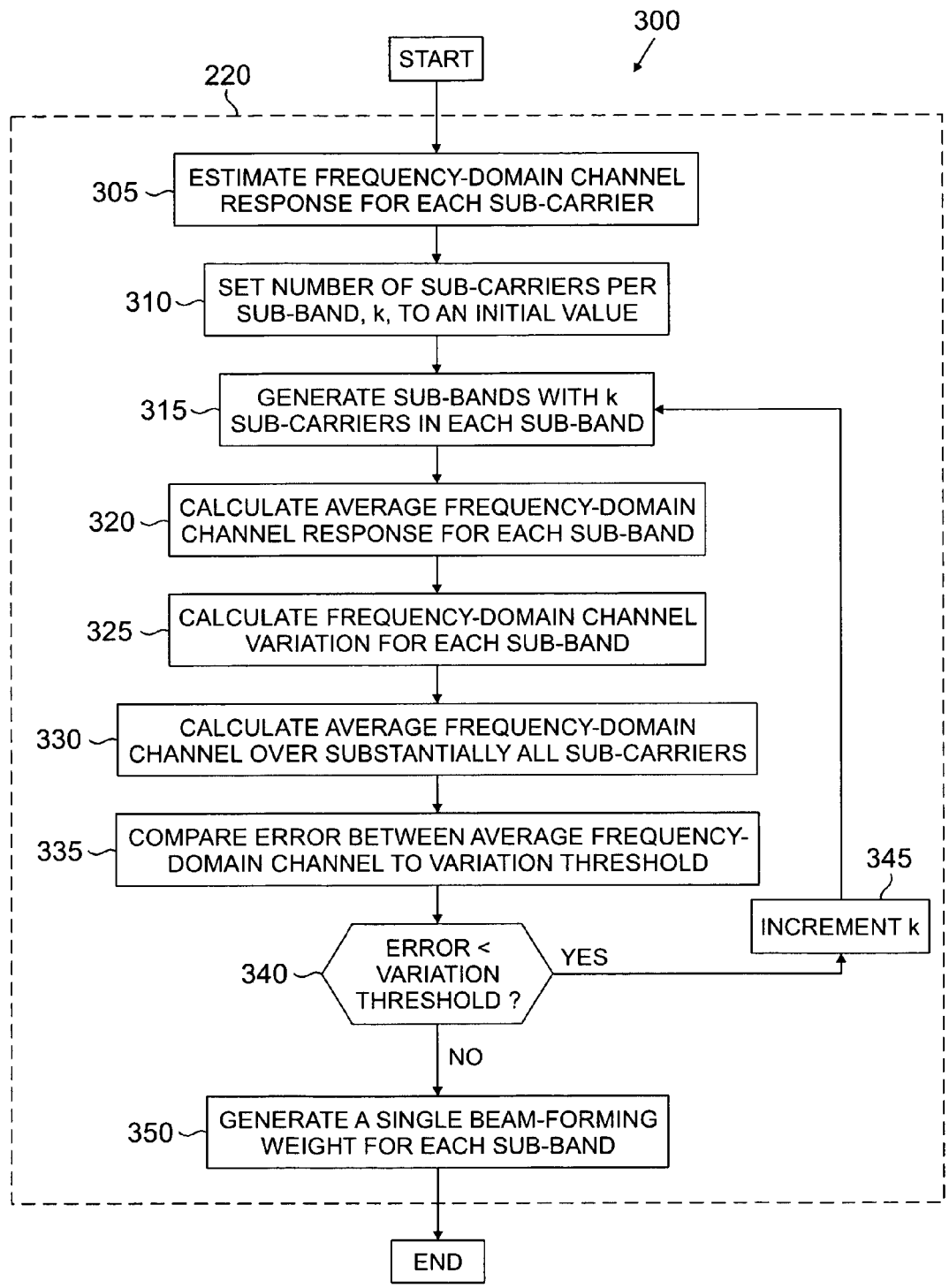
FIG. 3 is a flow diagram illustrating a method for generating beam-forming weights based on adaptively generated sub-bands using the system of FIG. 2 according to an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

FIG. 1 illustrates an exemplary orthogonal frequency division multiplexing (OFDM) wireless network 100 that is suitable for generating beam-forming weights according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, cafe, hotel, or college campus. Base station 102 may provide digital subscriber line (DSL) level service to subscriber stations 114, 115 and 116.

In accordance with an embodiment of the present disclosure, base stations 102-103 are each operable to utilize a multiple antenna beam-forming technique in order to transmit data more directly to a particular subscriber station 111-116. Using this technique, signal detection at each of the subscriber stations 111-116 is based upon combining a beam-forming weighted signal from multiple antennas on a sub-carrier basis. As described in more detail below, each base station 102-103 is operable to generate sub-bands of sub-carriers and to calculate a beam-forming weight for each sub-band based on estimations of frequency-domain channel responses for the sub-carriers. Base station 102-103 is then operable to transmit data to subscriber stations 111-116 by using the beam-forming weight for each sub-band to transmit the data on the sub-carriers in that sub-band.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively, In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

FIG. 2 illustrates details of a portion 200 of wireless network 100 including a system for generating beam-forming weights based on adaptively generated sub-bands according to an embodiment of the present disclosure. According to the illustrated embodiment, the portion 200 comprises a transmitter 205 and a receiver 210. For a particular embodiment, transmitter 205 may correspond to base station 102 and receiver 210 may correspond to one of subscriber stations 111-116 in communication with base station 102. However, it will be understood that transmitter 205 and receiver 210 may correspond to other suitable components of wireless network 100. For example, transmitter 205 may correspond to base station 103.

For the illustrated embodiment, transmitter 205 comprises an antenna array 215 and an adaptive weight generating system 220, and receiver 210 comprises an antenna 225. However, for some embodiments, adaptive weight generating system 220 may be implemented separately from transmitter 205 and may be operable to communicate with transmitter 205 in order to receive information from transmitter 205 for use in generating the beam-forming weights and to provide the beam-forming weights to transmitter 205. In addition, for some embodiments, a portion of adaptive weight generating system 220 may be implemented in transmitter 205, while another portion of adaptive weight generating system 220 may be implemented separately from transmitter 205.

Transmitter 205 and receiver 210 are operable to communicate with each other wirelessly through the use of antenna array 215 and antenna 225, respectively. For some embodiments, receiver 210 is operable to periodically transmit a pilot/training signal to transmitter 205 for use by transmitter 205 in providing service to receiver 210 and in generating beam-forming weights.

Adaptive weight generating system 220 comprises a frequency-domain channel response (FDCR) estimator 250, an average frequency-domain channel variation (FDCV) calculator 255, a sub-band generator 260, and a beam-forming weight generator 265. Although illustrated and described as four separate components, it will be understood that any combination of two or more of FDCR estimator 250, average FDCV calculator 255, sub-band generator 260, and beam-forming weight generator 265 may be implemented together as a single component without departing from the scope of the present disclosure. In addition, it will be understood that transmitter 205 and receiver 210 comprise additional components other than those illustrated in FIG. 2.

FDCR estimator 250 is operable to estimate a frequency-domain channel response for each sub-carrier for each antenna. For a particular embodiment, FDCR estimator 250 is operable to estimate the frequency-domain channel responses based on the pilot/training signal received from receiver 210. However, it will be understood that FDCR estimator 250 may estimate the responses based on any suitable signal or in any other suitable manner without departing from the scope of the present disclosure.

Average FDCV calculator 255 is coupled to FDCR estimator 250 and is operable to calculate an average frequency-domain channel variation over substantially all sub-bands for substantially all antennas in antenna array 215. As used herein, "substantially all" means at least 90%. Thus, average FDCV calculator 255 is operable to calculate an average frequency-domain channel response for each sub-band for each antenna in antenna array 215 and, based on the average responses, to calculate a frequency-domain channel variation for each sub-band as compared to an adjacent sub-band for each antenna in antenna array 215. Based on the frequency-domain channel variations for each sub-band, average FDCV calculator 255 is operable to calculate the average frequency-domain channel variation over substantially all sub-bands for substantially all antennas in antenna array 215.

Sub-band generator 260 is coupled to average FDCV calculator 255 and is operable to generate the sub-bands of sub-carriers. Sub-band generator 260 is operable to generate the sub-bands by grouping a specified number, k, of sub-carriers into each sub-band. Sub-band generator 260 is also operable to compare the average frequency-domain channel variation over substantially all sub-bands to a variation threshold in order to determine whether or not to adjust the specified number, k, of sub-carriers grouped by sub-band generator 260 into each sub-band. Sub-band generator 260 is also operable to set the specified number, k, to an initial value and to adjust the value of k when the average frequency-domain channel variation is greater than the variation threshold.

Beam-forming weight generator 265 is coupled to sub-band generator 260 and is operable to generate a single beam-forming weight for each of the sub-bands generated by sub-band generator 260. Thus, a single beam-forming weight is generated for each sub-band as opposed to each sub-carrier, thereby significantly reducing the computational complexity involved in generating the beam-forming weights. Transmitter 205 is then operable to use the beam-forming weights generated by beam-forming weight generator 265 in order to transmit data to receiver 210.

FIG. 3 is a flow diagram illustrating a method 300 for generating beam-forming weights based on adaptively generated sub-bands using adaptive weight generating system 220 according to an embodiment of the present disclosure. Initially, FDCR estimator 250 estimates a frequency-domain channel response for each sub-carrier for each antenna in antenna array 215 (process step 305). For a particular embodiment, FDCR estimator 250 estimates the frequency-domain channel responses based on a pilot/training signal received from receiver 210.

Sub-band generator 260 sets a specified number, k, of sub-carriers per sub-band to an initial value (process step 310). For a particular embodiment, the initial value may be two. However, it will be understood that the initial value may be any other suitable value. Sub-band generator 260 then generates sub-bands with k sub-carriers in each sub-band (process step 315).

Average FDCV calculator 255 calculates an average frequency-domain channel response for each sub-band for each antenna in antenna array 215 (process step 320) and, based on the average responses, calculates a frequency-domain channel variation for each sub-band as compared to an adjacent sub-band for each antenna in antenna array 215 (process step 325). Based on the frequency-domain channel variations for each sub-band, average FDCV calculator 255 calculates the average frequency-domain channel ($h_a$) over substantially all sub-carriers in a sub-band for substantially all antennas in antenna array 215 (process step 330). Given a complex channel response vector at sub-carrier i, h(i), the average channel on the sub-band is $h_a = 1/k * \text{sum}_{(\text{over all } i \text{ in subband})} h(i)$.

Sub-band generator 260 compares the error between the average frequency-domain channel ($h_a$) over substantially all sub-carriers in the sub-band and the furthest sub-carrier h(k), $\text{error}(k) = ||h(k) - h_a||$ to a variation threshold (process step 335). When the error(k) is less than the predefined variation threshold (process step 340), then the sub-band generator 260 increments the value of k (process step 345) and generates a new set of sub-bands using the new value of k (process step 315).

Once the error(k) is greater than or equal to the variation threshold (process step 340), beam-forming weight generator 265 generates a single beam-forming weight for all the sub-carriers within the sub-band (process step 350). Transmitter 205 may then transmit data to receiver 210 using a unique beam-forming weight for each sub-band when transmitting the data on the sub-carriers in that sub-band. The method 300 may be repeated at any particular interval or based on any suitable criteria such that the number of beam-forming weights to be calculated may be adaptively determined based on the current channel conditions.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A method of generating beam-forming weights in an orthogonal frequency division multiplexing (OFDM) network comprising a plurality of antennas, the method comprising:

generating a plurality of sub-bands, each sub-band comprising a specified number of sub-carriers;

for each antenna, calculating an average frequency-domain channel response for each sub-band;

for each antenna, calculating a frequency-domain channel variation for each sub-band;

calculating an average frequency-domain channel over substantially all sub-carriers for substantially all antennas;

comparing an error between the average frequency-domain channel over substantially all sub-carriers and a furthest sub-carrier to a variation threshold;

determining the specified number of sub-carriers based on the comparison of the error to the variation threshold; and generating a single beam-forming weight for each sub-band.

2. The method as set forth in claim 1, further comprising:

for each antenna, estimating a frequency-domain channel response for each of a plurality of sub-carriers; and generating the sub-bands based on the estimated frequency-domain channel responses.

3. The method as set forth in claim 2, estimating the frequency-domain channel responses comprising estimating the frequency-domain channel responses based on a received pilot/training signal.

4. The method as set forth in claim 2, the specified number of sub-carriers determined based on the estimated frequency-domain channel responses.

5. The method as set forth in claim 4, further comprising:

setting the specified number of sub-carriers to an initial value.

6. The method as set forth in claim 5, the specified number of sub-carriers incremented when the error is less than the variation threshold.

7. The method as set forth in claim 5, generating the single beam-forming weight for each sub-band comprising generating the single beam-forming weight for each sub-band when the error is greater than or equal to the variation threshold.

8. A method of generating beam-forming weights in an orthogonal frequency division multiplexing (OFDM) network comprising a plurality of antennas, the method comprising:

for each antenna, estimating a frequency-domain channel response for each of a plurality of sub-carriers;

generating a plurality of sub-bands, each sub-band comprising a specified number of sub-carriers;

for each antenna, calculating an average frequency-domain channel response for each sub-band;

for each antenna, calculating a frequency-domain channel variation for each sub-band;

calculating an average frequency-domain channel over substantially all sub-carriers for substantially all antennas;

comparing an error between the average frequency-domain channel over substantially all sub-carriers and a furthest sub-carrier to a variation threshold; and determining the specified number of sub-carriers based on the comparison of the error to the variation threshold; and generating a specified number of beam-forming weights, the specified number determined based on the estimated frequency-domain channel responses.

9. The method as set forth in claim 8, the plurality of sub-bands generated based on the estimated frequency-domain channel responses.

10. The method as set forth in claim 9, the specified number of sub-carriers determined based on the estimated frequency-domain channel responses.

11. The method as set forth in claim 10, further comprising:

setting the specified number of sub-carriers to an initial value.

12. The method as set forth in claim 11, the specified number of sub-carriers incremented when the error is less than the variation threshold.

13. The method as set forth in claim 11, generating the specified number of beam-forming weights comprising generating the specified number of beam-forming weights when the error is greater than or equal to the variation threshold.

14. The method as set forth in claim 8, estimating the frequency-domain channel responses comprising estimating the frequency-domain channel responses based on a received pilot/training signal.

15. A system of generating beam-forming weights in an orthogonal frequency division multiplexing (OFDM) network, comprising:

a frequency-domain channel response estimator configured to estimate, for each of a plurality of antennas, a frequency-domain channel response for each of a plurality of sub-carriers;

a sub-band generator configured to generate a plurality of sub-bands, each sub-band comprising a specified number of sub-carriers;

an average frequency-domain channel response calculator coupled to the sub-band generator and to the frequency-domain channel response estimator, the average frequency-domain channel response calculator configured to calculate, for each antenna, an average frequency-domain channel response for each sub-band and a frequency-domain channel variation for each sub-band and to calculate an average frequency-domain channel over substantially all sub-carriers for substantially all antennas; and a beam-forming weight generator coupled to the sub-band generator, the beam-forming weight generator configured to generate a single beam-forming weight for each sub-band;

wherein the sub-band generator is further configured to compare an error between the average frequency-domain channel over substantially all sub-carriers and a furthest sub-carrier to a variation threshold and to determine the specified number of sub-carriers based on the comparison of the error to the variation threshold.

16. The system as set forth in claim 15; and wherein the sub-band generator is further configured to generate the sub-bands based on the estimated frequency-domain channel responses.

17. The system as set forth in claim 16, the sub-band generator further configured to determine the specified number based on the estimated frequency-domain channel responses.

18. The system as set forth in claim 17, wherein the sub-band generator sets the specified number of sub-carriers to an initial value.

19. The system as set forth in claim 18, the sub-band generator further configured to increment the specified number of sub-carriers when the error is less than the variation threshold.

20. The system as set forth in claim 18, the beam-forming weight generator configured to generate the single beam-forming weight for each sub-band when the error is greater than or equal to the variation threshold.

\* \* \* \* \*

UNITED STATES PATENT AND TRADEMARK OFFICE
CERTIFICATE OF CORRECTION

| | |
|---|---|
| PATENT NO. | : 7,586,989 B2 |
| APPLICATION NO. | : 11/285546 |
| DATED | : September 8, 2009 |
| INVENTOR(S) | : Tsai et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Twenty-first Day of September, 2010

David J. Kappos
*Director of the United States Patent and Trademark Office*